United States Patent
Fisher et al.

(10) Patent No.: US 8,516,254 B2
(45) Date of Patent: *Aug. 20, 2013

(54) METHOD AND APPARATUS FOR COMMUNICATING INFORMATION BETWEEN A SECURITY PANEL AND A SECURITY SERVER

(75) Inventors: Gerald B. Fisher, Brainerd, MN (US); Theodore A. Nesse, Stillwater, MN (US); Sunil Kumar Neckaraje, Karnataka (IN); Uwe H. Thomanschefsky, Shoreview, MN (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,279

(22) Filed: Dec. 20, 2011

(65) Prior Publication Data
US 2012/0096265 A1   Apr. 19, 2012

Related U.S. Application Data

(63) Continuation of application No. 12/069,874, filed on Feb. 12, 2008, now Pat. No. 8,132,008.

(51) Int. Cl.
*H04L 63/08* (2006.01)

(52) U.S. Cl.
USPC ................ 713/168; 713/162; 713/171; 726/4

(58) Field of Classification Search
USPC .......................................................... 713/162
See application file for complete search history.

(56) References Cited

U.S. PATENT DOCUMENTS

| | | | |
|---|---|---|---|
| 5,771,292 A | 6/1998 | Zunquan | |
| 6,041,409 A | 3/2000 | Zunquan | |
| 6,044,154 A | 3/2000 | Kelly | |
| 6,073,240 A | 6/2000 | Kurtzberg et al. | |
| 6,353,385 B1 | 3/2002 | Molini et al. | |
| 6,570,496 B2 | 5/2003 | Britton | |
| 6,868,493 B2 | 3/2005 | Orlando et al. | |
| 7,281,134 B2 * | 10/2007 | Schmit | 713/182 |
| 7,325,134 B2 | 1/2008 | Fascenda | |
| 8,132,008 B2 * | 3/2012 | Fisher et al. | 713/168 |
| 2002/0166047 A1 * | 11/2002 | Kawamoto | 713/169 |

(Continued)

OTHER PUBLICATIONS

Honeywell, "AlarmNet—7845GSM/7845GSMCN Digital Cellular Communicator—Installation and Setup Guide," Nov. 2006 Rev. A, pp. 1-48.*

(Continued)

*Primary Examiner* — Luu Pham
(74) *Attorney, Agent, or Firm* — MH2 Technology Law Group LLP

(57) ABSTRACT

A security panel includes a processor, memory, and a network interface having a unique MAC address, and is configured to communicate over a network with a server. A method for registering the security panel with the server includes contacting the server utilizing a network address stored in the memory. A dealer ID, a line number, and a unique account number is sent to the server. The dealer ID, the line number, and the unique account number are stored in the memory. An encryption key is received for encryption of additional communication between the security panel and the server. The unique MAC address is sent to the server in an encrypted session to verify the security panel to the server.

20 Claims, 6 Drawing Sheets

(56) References Cited

U.S. PATENT DOCUMENTS

| | | | |
|---|---|---|---|
| 2003/0051146 A1* | 3/2003 | Ebina et al. | 713/185 |
| 2005/0216738 A1* | 9/2005 | Kita et al. | 713/168 |
| 2005/0225809 A1* | 10/2005 | Tonegawa | 358/402 |
| 2005/0228991 A1* | 10/2005 | Schmit | 713/168 |
| 2007/0053508 A1* | 3/2007 | Yasumoto | 380/28 |
| 2008/0005026 A1* | 1/2008 | Cross et al. | 705/51 |
| 2008/0077794 A1* | 3/2008 | Arnold et al. | 713/169 |
| 2008/0275940 A1* | 11/2008 | Yamada et al. | 709/203 |
| 2010/0153510 A1* | 6/2010 | Tonegawa | 709/206 |

OTHER PUBLICATIONS

"PW-6000—Intelligent Controller—Installation and Configuration Guide," Jul. 2007, Honeywell, pp. 1-36.*

* cited by examiner

Gateway Registration Report

Date Range  From        To
mm/dd/yy    04/09/2007 - 05/06/2007

Status  ○ Successful  ⊙ Failed  ○ Both

[Search]  ← 302

List of Failed Registrations:

| Gateway ID | Acccount Identifier | Start Time | Show |
|---|---|---|---|
| 115 | UWE-11112222-6517732401 | 5/2/2007 12:29:46 PM | SHOW |
| 114 | UWE-11112222-6517732401 | 5/2/2007 12:23:49 PM | SHOW |
| 113 | UWE-11112222-6517732401 | 5/2/2007 12:14:21 PM | SHOW |
| 112 | UWE-11112222-6517732401 | 5/2/2007 11:28:44 PM | SHOW |
| 111 | UWE-11112222-6517732401 | 5/2/2007 11:23:15 AM | SHOW |
| 109 | UWE-11112222-6517732401 | 5/2/2007 10:52:26 AM | SHOW |
| 108 | UWE-11112222-6517732401 | 5/2/2007 10:50:13 AM | SHOW |
| 106 | UWE-6517732401-11112222 | 5/2/2007 10:39:59 AM | SHOW |
| 104 | UWE-6517732401-11112222 | 5/2/2007 10:10:47 AM | SHOW |

ABC Alarms
- Account Features
  Account Upload
  Account Deletion
- Batch Delete
  Dealers
  Installers
  Local Responders
  Accounts
- Gateway Registration
  Gateway Lot Details
  Gateway Registration Report
- Other
  Return to Previous Page

FIG. 5

Gateway Registration Report

Date Range mm/dd/yy — From 04/09/2007 - To 05/06/2007

Status ○ Successful ○ Failed ⦿ Both

[Search] ← 402

List of Registrations:

| Gateway ID | Account Identifier | Start Time |
|---|---|---|
| 116 | UWE-1112222-6517732401 | 5/2/2007 12:31:49 PM |
| 115 | UWE-1112222-6517732401 | 5/2/2007 12:29:46 PM |
| 114 | UWE-1112222-6517732401 | 5/2/2007 12:23:49 PM |
| 113 | UWE-1112222-6517732401 | 5/2/2007 12:14:21 PM |
| 112 | UWE-1112222-6517732401 | 5/2/2007 11:28:44 AM |
| 111 | UWE-6517732401-1112222 | 5/2/2007 11:23:15 AM |
| 110 | UWE-1112222-6517732401 | 5/2/2007 11:04:40 AM |
| 109 | UWE-6517732401-1112222 | 5/2/2007 10:52:25 AM |
| 108 | UWE-6517732401-1112222 | 5/2/2007 10:50:13 AM |

ABC Alarms
- Account Features
  - Account Upload
  - Account Deletion
- Batch Delete
  - Dealers
  - Installers
  - Local Responders
  - Accounts
- Gateway Registration
  - Gateway Lot Details
  - Gateway Registration Report
- Other
  - Return to Previous Page Status bar

METHOD AND APPARATUS FOR COMMUNICATING INFORMATION BETWEEN A SECURITY PANEL AND A SECURITY SERVER

CROSS-REFERENCE TO RELATED APPLICATION(S)

This application is a continuation application of U.S. patent application Ser. No. 12/069,874, filed Feb. 12, 2008. All references are incorporated herein.

FIELD OF THE INVENTION

The field of the present invention relates generally to security systems and, more particularly, to methods and apparatus for securely communicating information between one or more security panels and a centralized security server.

BACKGROUND OF THE INVENTION

At least one known security panel, such as the SIMON® security panel available from GE interlogix, is sold to dealers with programmable identifiers. For example, dealer identification, line number and panel account number are provided with factory default settings. The factory default identifiers can be modified or set appropriately for a particular dealer by the dealer or by an installer before a security panel is sold to a customer. The factory default identifiers are communicated by the security panels to a centralized security server for information exchange and to allow online status changes. Also, the centralized security server sends a new encryption key to the security panel that replaces a factory default key. Although there is a mechanism in place to determine account holder information online and a data security mechanism for communication with the centralized security server, Internet threats continue to multiply. Dealers are not always in the best position to implement additional security measures due to communication delays introduced by a geographical spread of the service across the world and the fact that many dealer service agents are not technically trained.

One exemplary type of security threat occurs when a plurality of homes share a bandwidth of a high speed Internet connection, such as those provided by cable TV companies. It may thus be possible, in some cases, for a malicious hacker to determine or guess an IP address assigned to a security panel and try to send packets to the security server with a falsely identified source. The result of such hacking may have undesirable consequences from the standpoint of the server operator and/or the security panel owner. In addition, a security/gateway panel may be provided in a hotel, motel, apartment building or condominium complex, wherein many or all of the security/gateway panels share a single communication line, such as an Ethernet cable.

BRIEF DESCRIPTION OF THE INVENTION

In one aspect, a method is provided for registering a security panel with a server. The security panel has a processor, memory, and a network interface having a unique MAC address. The security panel is configured to communicate over a network with the server. The method includes contacting the server utilizing a network address stored in the memory. A dealer ID, a line number, and a unique account number stored in the memory is sent to the server. The security panel receives an encryption key from the server for encryption of additional communication between the security panel and the server. The unique MAC address is sent to the server in an encrypted session to verify the security panel to the server.

In another aspect, a set of networked devices is provided. The set of networked devices includes a server having a database stored in memory and a security panel having a processor, memory, and a network interface having a unique media access controller (MAC) address. The server and the security panel are configured to communicate with one another via a network. The security panel is configured to contact the server utilizing a network address and/or a URL stored in the security panel memory, register with the server database a dealer ID, a line number, and a unique account number, the dealer ID, the line number, and the unique account number stored in the security panel memory, and receive an encryption key for encryption of additional communication between the security panel and the server. The server is configured to validate or reject registrations from the security panel in accordance with values stored in the database and send an encryption code to the security panel for validated registrations. The security panel is configured to send the unique MAC address to the server during an encrypted session to validate the identity of the security panel. The server is configured to accept or reject further communications depending upon a validity of the unique MAC address.

In yet another aspect, a security panel is provided. The security panel includes a processor, memory, and a network interface having a unique MAC address. The security panel is configured to communicate over a network with a server. The security panel is further configured to contact the server utilizing a network address stored in the memory, register the security panel with the server including sending a dealer ID, a line number, and a unique account number stored in the memory, receive an encryption key for encryption of additional communication between the security panel and the server, and send the unique MAC address to the server in an encrypted session to verify the security panel to the server.

BRIEF DESCRIPTION OF THE DRAWINGS

FIGS. 1-6 show exemplary embodiments of the method and apparatus described herein.

FIG. 1 is a perspective view of an exemplary security/gateway panel.

FIG. 2 is a schematic view of an exemplary set of networked devices including a server and a security/gateway panel.

FIG. 3 is a data flow diagram of an exemplary communication method between a security/gateway panel and a server.

FIG. 4 is a screenshot of an exemplary web page showing a list of successful registrations of security/gateway panels.

FIG. 5 is a screenshot of an exemplary web page showing a list of failed registrations of security/gateway panels.

FIG. 6 is a screenshot of an exemplary web page showing a list of attempted registrations of security/gateway panels.

Figure 1:
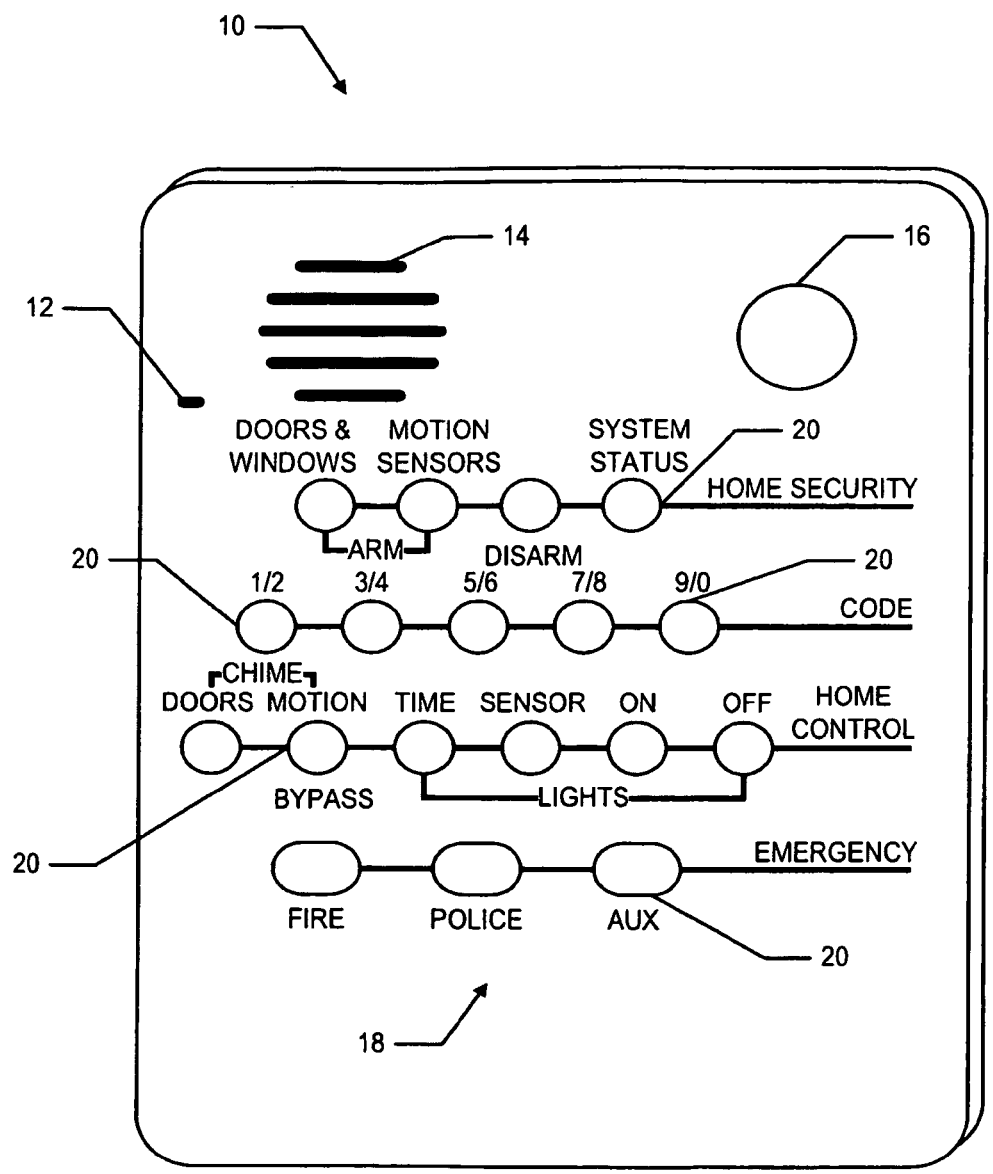

The foregoing summary, as well as the following detailed description of certain embodiments of the present invention, will be better understood when read in conjunction with the appended drawings. It should be understood that the various embodiments are not limited to the arrangements and instrumentality shown in the drawings. For example, to the extent that the figures illustrate diagrams of the functional blocks of various embodiments, the functional blocks are not necessarily indicative of the division between hardware circuitry. Thus, one or more of the functional blocks (e.g., processors or memories) may be implemented in a single piece of hardware (e.g., a general purpose signal processor or a block or random access memory, hard disk, etc.). Similarly, the programs may be stand alone programs, or may be incorporated as subroutines in an operating system, or may be functions in an installed software package.

DETAILED DESCRIPTION OF THE INVENTION

Figure 2:
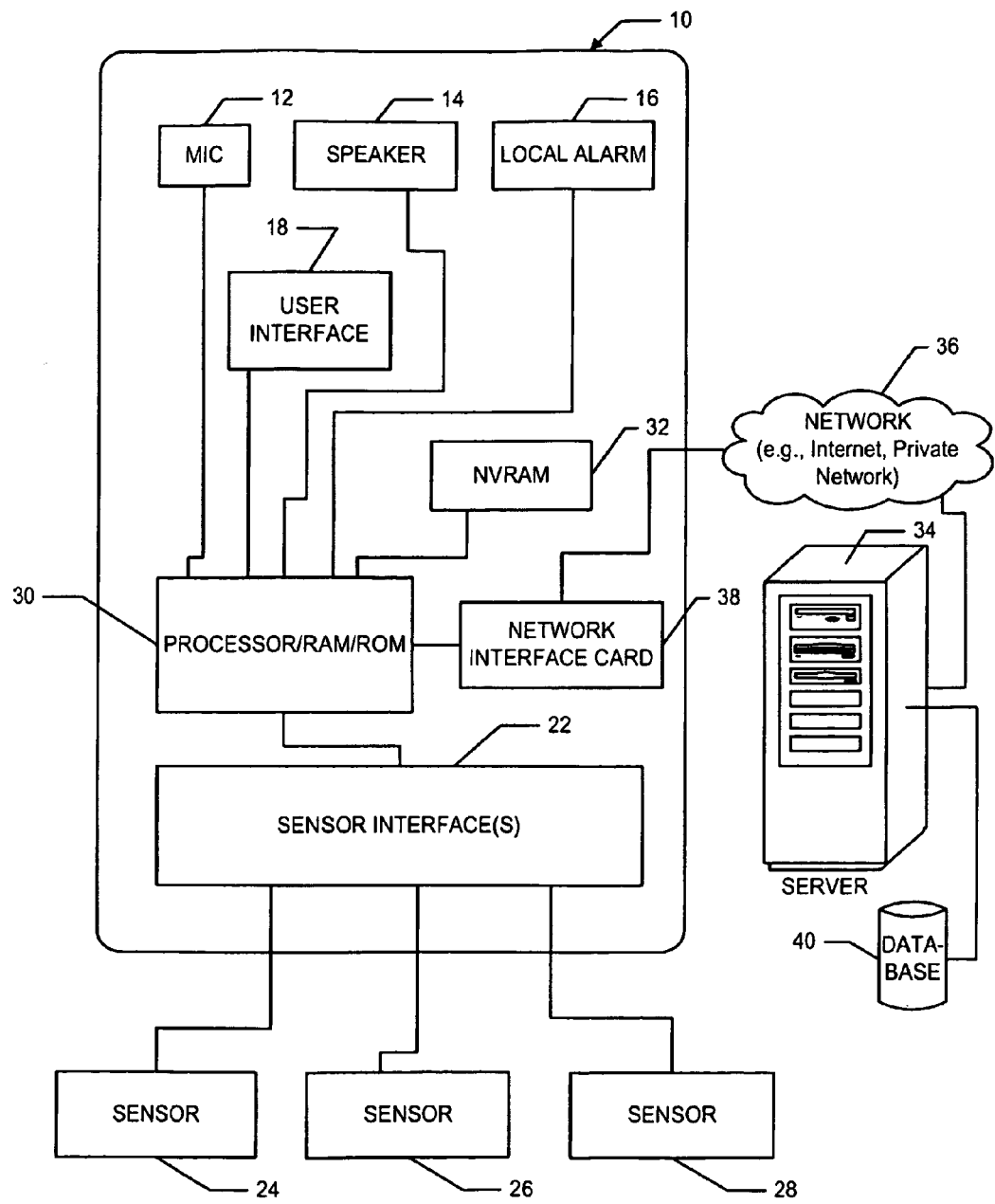

The field of the present invention provides a server. A technical effect of the server is to facilitate user interaction with security and related equipment located in remote installations. In some embodiments and referring to FIG. 1, a security or gateway panel, referred to herein as security panel 10, is provided with a microphone 12, a speaker 14, and a local alarm 16. A user interface 18 is provided with a plurality of system control buttons 20. Although not visible in FIG. 1, a sensor interface or a plurality of sensor interfaces is/are also provided for receiving sensor information from various parts of a house in which security panel 10 is installed. FIG. 2 is a schematic view of an exemplary set of network devices including a server and a security panel showing sensor interfaces 22 and sensors 24, 26, and 28. Sensors 24, 26, and 28 may be, for example, open window sensors, open door sensors, fire or smoke sensors, or other suitable security sensors.

Referring further to FIG. 2, in one embodiment, security panel 10 also includes a processor 30, which may include random access memory (RAM) and/or read only memory (ROM), or be in communication with one or more types of external memory. In one embodiment, a non-volatile random access memory (NVRAM) 32 is included. Factory default identifiers may be stored in NVRAM 32. In particular embodiments, to successfully establish an account with a premises manager server 34 for continuous monitoring, the factory default programmable identifiers stored in NVRAM 32 in security panel 10 are replaced with actual identifiers that identify the account holder associated with the gateway and identifiers that provide dealer information. In one embodiment, communication is established between security panel 10 and server 34 via a public or private network 36, such as the Internet, using a network interface in security panel 10, e.g., network interface card (NIC) 38, which is assigned a globally unique media access controller (MAC) address by its manufacturer.

A software module (which can be provided as an option) in ROM of processor 30 (or in any suitable accessible memory) registers a new security panel 10 with server 34 via HTTP or any suitable network communication protocol, using, for example, a Uniform Resource Locator (URL) or any suitable address stored in memory. Also, to enable update or modification of any of the stored programmable identifiers or other parameter values in security panel 10, a web interface (not shown in FIG. 2) is provided with server 34 to remotely establish a session with security panel 10 and to program the identifiers or other parameter values.

A new encryption key is generated during registration of security panel 10 with server 34. To ensure security of the new key while transferring the key over network 36, a unique 24-byte random key is generated using a xor method. The unique 24-byte random key is used for encryption for the registration session. This algorithm uses a fixed key that is stored in server database 40 against each manufacturing lot number for each security panel 10 plus a randomly generated key using a Microsoft .Net random number generator class to generate the 24-byte random key. In one embodiment, the key for each lot of manufacture is changed for security reasons. This unique key is sent to security panel 10 for data encryption/decryption. The encryption algorithm in one embodiment is based on Digital Encryption Standard 3 (DES-3).

Figure 3:
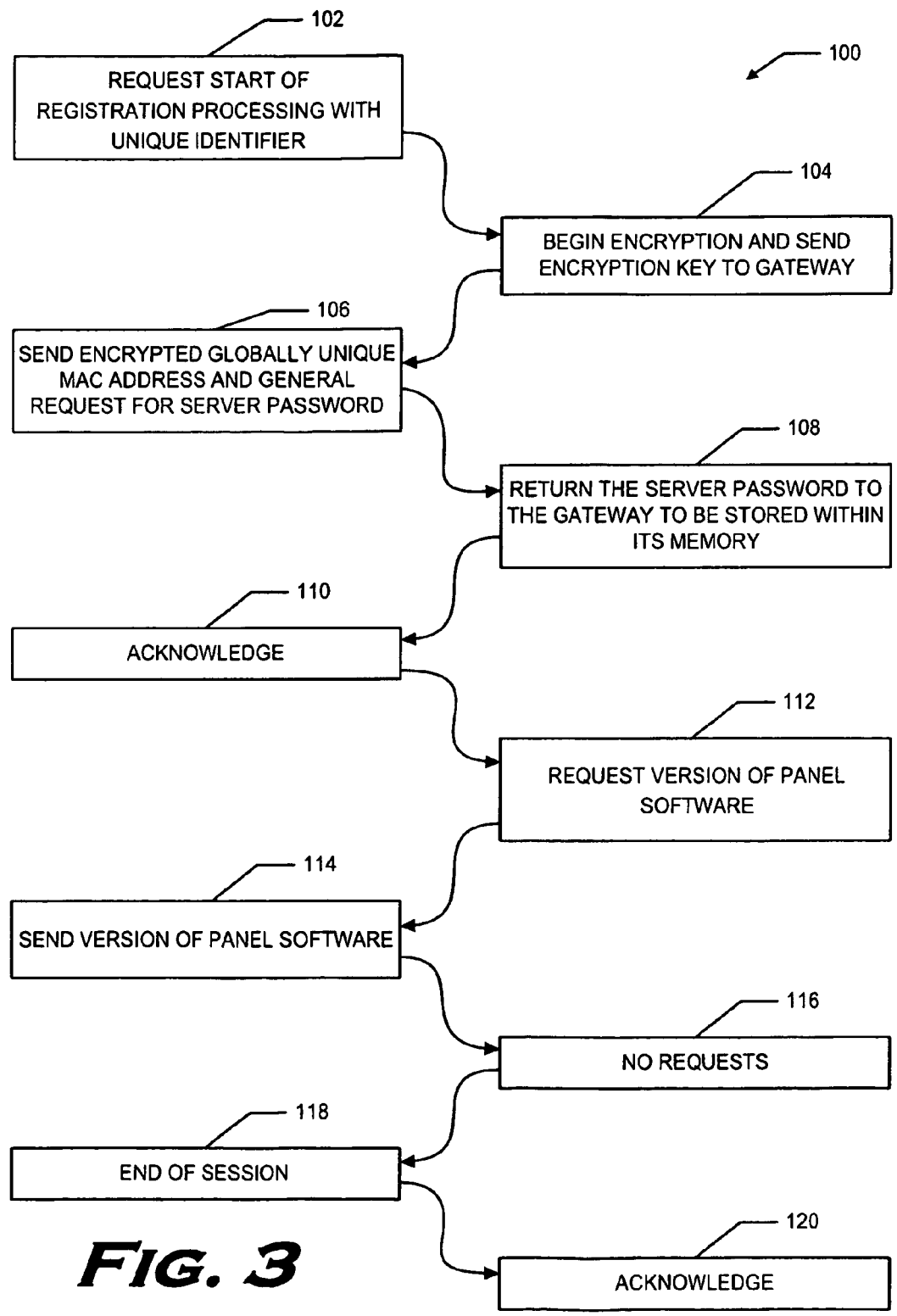

Referring to FIGS. 2 and 3, in one embodiment a method is provided for registering a security panel 10 with a server 34. In FIG. 3, operations performed by security panel 10 are shown on the left, whereas operations performed by server 34 are shown on the right. Data exchange flows across network 36, indicated by arrows crossing the center of data flow diagram 100. Security panel 10 has a processor 30, memory, which may be in processor 30 and/or may include NVRAM 32, and a network interface controller 38 having a unique MAC address. Security panel 10 uses network interface controller 38 to communicate over a public or private network, such as network 36, to server 34. The method includes, at 102, contacting server 34 utilizing a network address or URL stored in memory in processor 30 and/or NVRAM 32 with a request to register security panel 10 with server 34. The request includes sending a dealer ID, a line number, and a unique account number, all of which can be stored in memory of security panel 10 by a dealer. A lot number stored by the manufacturer of security panel 10 may also be communicated.

Server 34 then compares this information to data stored in database 40. If the data does not match that of an authorized security panel 10, server 34 rejects the request to register security panel 10. Otherwise, at 104, server 34 sends an encryption key to security panel 10 and begins an encrypted session therewith. In one embodiment, DES-3 encryption is used by security panel 10 to send an encrypted communication to server 34 and/or receive an encrypted communication from server 34. The encryption key is a 24-byte pseudo-random key in a particular embodiment.

During the encrypted session, at 106, security panel 10 sends the globally unique MAC address of network interface controller 38, as well as a general request for the server password. If the globally unique MAC address does not match the authorized entry in database 40 of server 34, the session is ended. If the globally unique MAC address matches the authorized entry in database 40 of server 34, at 108, the server password is sent by server 34 to security panel 10 and acknowledged by security panel 10 at 110. The globally unique MAC address is encrypted when sent to server 34 and need not otherwise be sent in IP packets on network 36, which may be the Internet or another public or private network. At 112, server 34 requests the gateway version from security panel 10 for storing in server database 40 and, at 114, security panel 10 sends the gateway type firmware version and hardware version to server 34. Server 34 then sends a "no requests" code to security/panel 10 at 116. Security panel 10 acknowledges the "no requests" code by sending an "end of session" code back to server 34 at 118, which is acknowledged by server 34 at 120. The acknowledgement terminates the session.

In one embodiment, security panel 10 is configured to attempt additional communications with server 34, such as an alarm session. The additional communications also include the unique MAC address of the network interface for authentication purposes, and server 34 will reject communications with security panel 10 unless the correct MAC address is received. Also, the dealer ID, line number, and unique account number can be stored in a memory of security panel 10 by a dealer and server database 40 is configured to accept the dealer-stored dealer ID, line number, and unique account number to register security panel 10.

Figure 4:
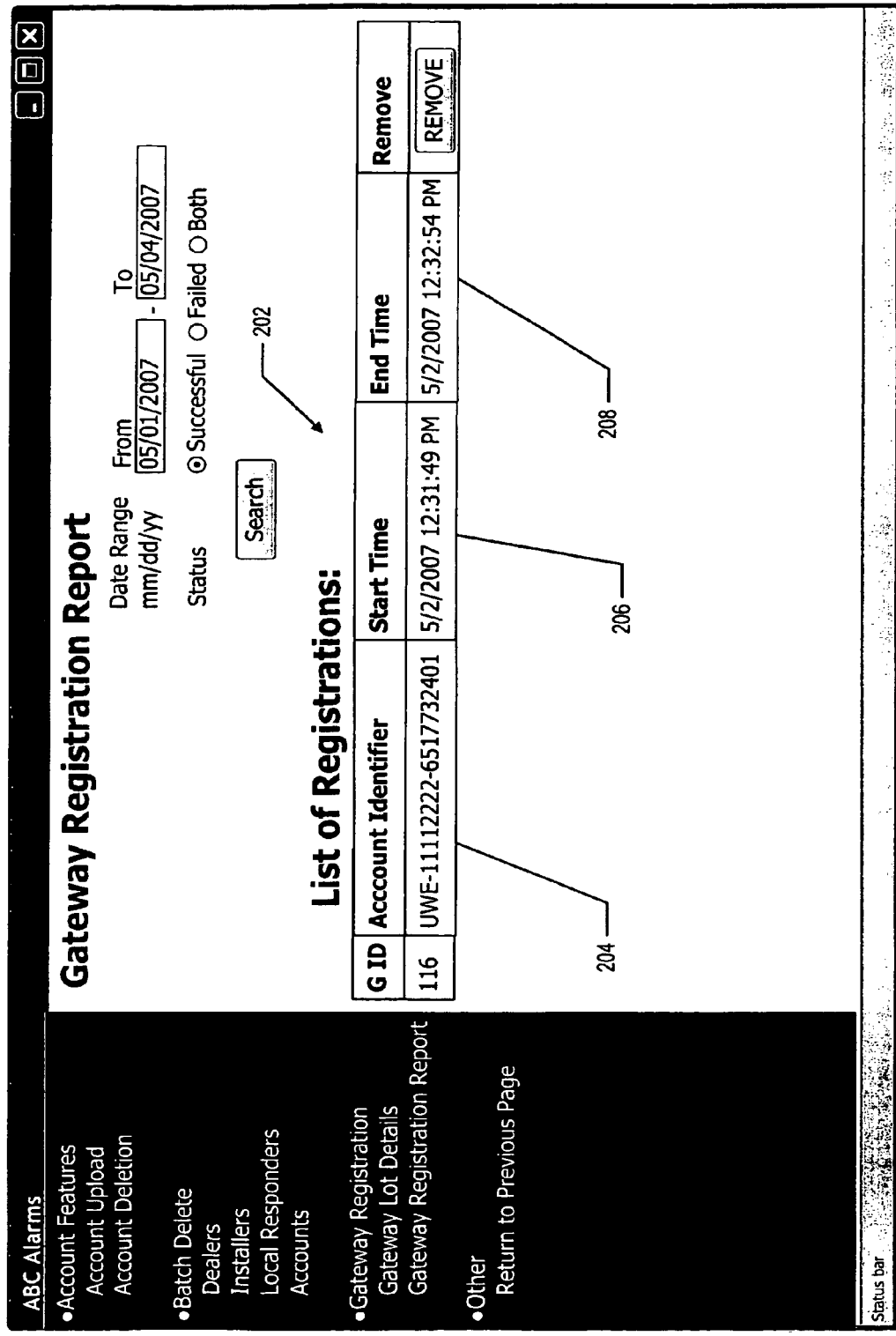

Referring to FIGS. 4, 5, and 6, in certain embodiments server 34 is configured to provide, but only upon receipt of an authorization login and password, one or more web pages 200, 300, and/or 400 showing successful registrations 202, failed registrations 302, or all attempted registrations 402, respectively. Referring to FIG. 4, server 34 is configured to provide web page 200 showing one or more successful registrations 202. Web page 200 includes a unique account identifier 204, a start time 206, and an end time 208 for each listed successful registration. In further embodiments, any suitable information and/or data for each listed successful registration may be listed on web page 200. Referring to FIG. 5, server 34 is configured to provide web page 300 showing failed registrations 302. Web page 300 includes a unique account identifier 204 and a start time 206 for the listed failed registrations. Referring to FIG. 6, server 34 is configured to provide web page 400 showing all attempted registrations 402, successful or failed. Similar to web page 200, additional information and/or data may be listed on web page 300 and/or web page 400.

It should be apparent to those skilled in the art and guided by the teachings herein provided that there will often be a plurality of security panels operating together with one or more servers in a network. Therefore, the scope of an embodiment recited as having or comprising a security panel and/or a server includes embodiments having more than one security panel and/or more than one server. It will be appreciated that the present invention provides a cost-effective, trouble-free, real-time, secure system to program identifiers into a premises manager server and to transfer an encryption key to a security or gateway panel.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

While the invention has been described in terms of various specific embodiments, those skilled in the art will recognize that the invention can be practiced with modification within the spirit and scope of the claims.

The invention claimed is:

1. A method for registering a security panel through communication over network with a server, the method comprising:
contacting the server utilizing an address of the server stored in a memory of the security panel;
sending the server programmable identifiers stored in the memory to register the security panel with the server;
receiving from the server an encryption key to encrypt additional communication exchanged between the security panel and the server;
encrypting a unique address of the security panel;
encrypting a request for a server password used for an authentication to gain access to the server;
send to the server
the encrypted unique address of the security panel allow the server to validate the identity of the security panel, and
the encrypted request for the server password; and
receiving the server password and storing the server password in the memory.

2. The method of claim 1, further comprising:
receiving a request by the server for a version of software being used by the security panel; and
sending to the server an identification of the software being used by the security panel.

3. The method of claim 1, wherein the programmable identifiers include a unique account number.

4. The method of claim 3, wherein the programmable identifiers further include dealer information.

5. The method of claim 1, wherein the programmable identifiers include at least one of: a dealer identification (ID), a line number, a lot number, and an account number.

6. The method of claim 1, further comprising:
storing the programmable identifiers in the memory prior to contacting the server.

7. The method of claim 1, further comprising:
providing by the server a web page showing at least one of a list of successful registrations, a list of failed registrations, and a list of attempted registrations.

8. The method of claim 7, wherein the server provides a web page showing a list of failed registrations, the web page listing each failed registration including a unique account identifier and a start time for each attempted registration.

9. The method of claim 7, wherein the server provides a web page showing a list of attempted registrations, the web page listing each attempted registration including a unique account identifier and a start time for each attempted registration.

10. The method of claim 7, wherein the server provides a web page showing a list of successful registrations, the web page listing each successful registration including a unique account identifier, a start time and an end time for each successful registration.

11. A method for registering and validating a security panel with a server, the method comprising:
storing programmable identifiers in a memory of the security panel;
storing, in a database of the server, values representing authorized security panels;
contacting the server over a network utilizing an address stored in the memory of the security panel;
sending the stored programmable identifiers from the security panel to the server to register the security panel with the server;
validating or rejecting registration of the security panel based upon a comparison of the stored programmable parameters received from the security panel with the values stored in the database;
if the registration is validated, sending an encryption key from the server to the security panel to encrypt additional communication exchanged between the security panel and the server;
receiving the encryption key at the security panel;
encrypting the unique address using the received encryption;
sending the encrypted unique address to the server;
sending a request for a server password used for an authentication to gain access to the server from the security panel to the server; and
sending the server password from the server to the security panel.

12. The method of claim 11, further comprising:
sending a request from the server to the security panel to identify a version of software being used by the security panel; and
sending an identification of the version of the software being used from the security panel to the server.

13. The method of claim 11, wherein the programmable identifiers include a unique account number.

14. The method of claim 13, wherein the programmable identifiers further include dealer information.

15. The method of claim 11, wherein the programmable identifiers include at least one of: a dealer identification (ID), a line number, a lot number, and an account number.

16. A security panel comprising:
a processor;
a memory; and
a network interface having a unique address;
wherein the security panel is configured to:
  contact the server over a network utilizing an address stored in the memory;
  register the security panel with the server by sending the server programmable identifiers stored in the memory;
  receive from the server an encryption key to encrypt additional communication exchanged between the security panel and the server;
  encrypt the unique address using the received encryption key;
  send the encrypted unique address to the server that allows the server to validate the identity of the security panel;
  request from the server a server password used for an authentication to gain access to the server; and
  receive the server password from the server.

17. The security panel of claim 16, further configured to conduct additional communications with the server using the encrypted unique address.

18. The security panel of claim 16, further configured to:
receive a request by the server for a version of software being used by the security panel; and
sending to the server an identification of the software being used by the security panel.

19. The security panel of claim 16, wherein the programmable identifiers include at least one of: a dealer identification (ID), a line number, a lot number, and a unique account number.

20. The security panel of claim 16, wherein the programmable identifiers include dealer information.

* * * * *